US005160237A

United States Patent [19]

Lutz

[11] Patent Number: 5,160,237

[45] **Date of Patent: * Nov. 3, 1992**

[54] APPARATUS FOR LOADING AND UNLOADING OBJECTS

[76] Inventor: David W. Lutz, P.O. Box 4444, Carlisle, Pa. 17013

[ * ] Notice: The portion of the term of this patent subsequent to Jun. 4, 2008 has been disclaimed.

[21] Appl. No.: 666,928

[22] Filed: Mar. 11, 1991

[51] Int. Cl.[5] .......... B65G 7/00

[52] U.S. Cl. .......... 414/609; 198/346.1; 198/346.2; 74/89.2; 414/639; 414/778

[58] Field of Search .......... 414/413, 425, 561, 608, 414/628, 639, 640, 798.5, 778, 267, 281, 609; 198/346.1, 346.2; 74/89.2, 89.21

[56] References Cited

U.S. PATENT DOCUMENTS

| | | | |
|---|---|---|---|
| 535,009 | 3/1895 | Housinger | 414/425 X |
| 3,047,095 | 7/1962 | Bell et al. | 74/89.21 X |
| 3,074,563 | 1/1963 | Montgomery | 74/89.21 X |
| 3,373,879 | 3/1968 | Verini | 414/640 X |
| 3,623,617 | 11/1971 | Nemessanyi | 414/640 X |
| 4,265,582 | 5/1981 | Theobald | 414/281 X |
| 4,450,400 | 5/1984 | Gwyn | 414/281 X |
| 4,568,233 | 2/1986 | Baker et al. | 414/267 |
| 4,749,327 | 6/1988 | Roda | 74/89.2 X |
| 5,020,382 | 6/1991 | Lutz | 74/89.2 |
| 5,037,047 | 8/1991 | Chanko | 414/778 X |

*Primary Examiner*—David A. Bucci
*Assistant Examiner*—James Keenan

[57] ABSTRACT

Apparatus for loading and unloading objects including a first carriage; apparatus for moving the first carriage back and forth in a straight line in a first plane between a first position and second position; a second carriage; apparatus for moving the second carriage back and forth between the first position and the second position such that, when the first carriage is in the first position, the second carriage is in the second position and, as the first carriage moves to the second position, the second carriage moves out of the first plane, then back into the first plane and into the first position; and apparatus for tilting both carriages to provide ready access to their insides at least when each carriage is in its first position.

98 Claims, 8 Drawing Sheets

APPARATUS FOR LOADING AND UNLOADING OBJECTS

FIELD OF THE INVENTINO

This invention relates to apparatus for loading and unloading objects such as palletized loads. In particular, it relates to such apparatus in which a plurality of carriages alternate between two positions, such as a loading/unloading station on an assembly line and a position having access to the lift of a truck.

CROSS-REFERENCE TO A RELATED PATENT

This application discloses and claims an improvement on TM the invention disclosed and claimed in U.S. Pat. No. 5,020,382. The disclosure of that patent is hereby incorporated herein by reference.

BACKGROUND OF THE INVENTION

Palletized loads are often loaded and unloaded using a plurality of carriages that alternate between two positions on a continuous looped track, which may be either in a horizontal plane (like a racetrack) or in a vertical plane (like a ferris wheel). While both these lay outs are relatively simple mechanically, they consume a relatively large amount of floor space. Accordingly, a need has been apparent for apparatus for alternating a plurality of carriages between two positions that would consume less floor space, even at the cost of some increase in the complexity of the mechanisms involved.

OBJECTS OF THE INVENTION

It is the principal object of this invention to provide apparatus for alternating a plurality of carriages between two positions which consumes relatively little floor space.

It is another object of the invention to provide such apparatus which is as sturdy as possible, which employs hardware that is not prone to mechanical failure, and which requires relatively little maintenance.

It is still another object of the invention to provide such apparatus which requires less operator time to operate than do prior art devices.

SUMMARY OF THE INVENTION

With the foregoing in mind, the apparatus for loading and unloading objects according to the invention includes a first carriage; first means for moving the first carriage back and forth in a straight line in a first plane between a first position and a second position; a second carriage; second means for moving the second carriage back and forth between the first position and the second position such that, when the first carriage is in the first position, the second carriage is in the second position and, as the first carriage moves to the second position, the second carriage moves out of the first plane, then back into the first plane and into the first position; and third means for tilting both carriages to provide ready access to their insides at least when each carriage is in its first position.

DETAILED DESCRIPTION OF THE PRESENTLY PREFERRED EMBODIMENT

Figure 2:
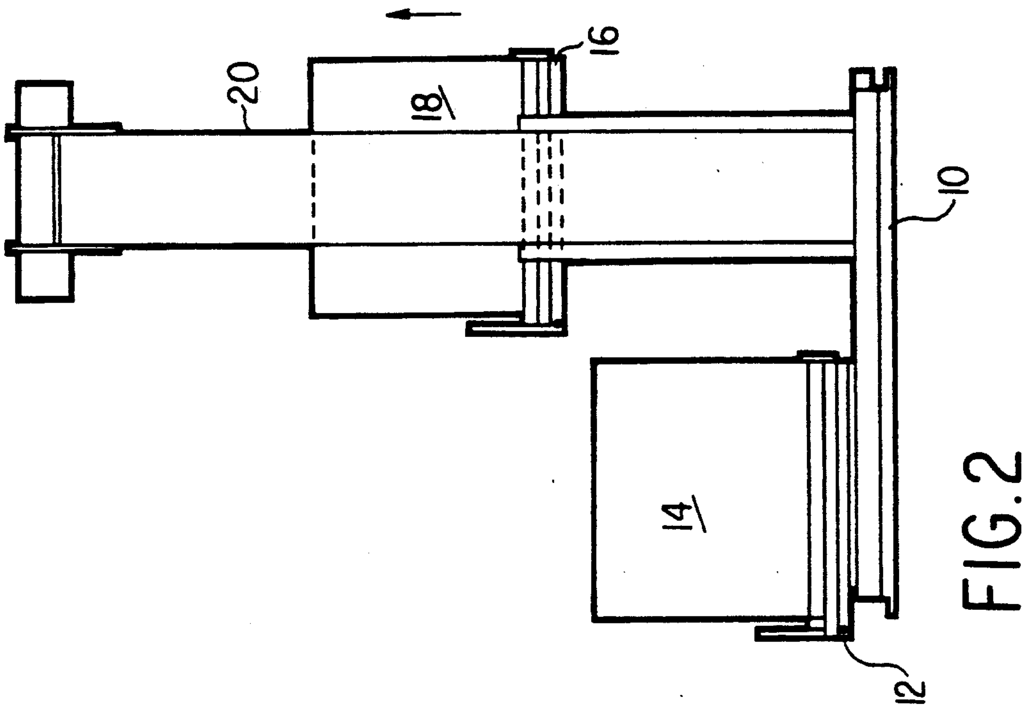
FIG. 2 is a schematic side view of the invention showing the first carriage in the first position and the second carriage in a first intermediate position.
Figure 1:
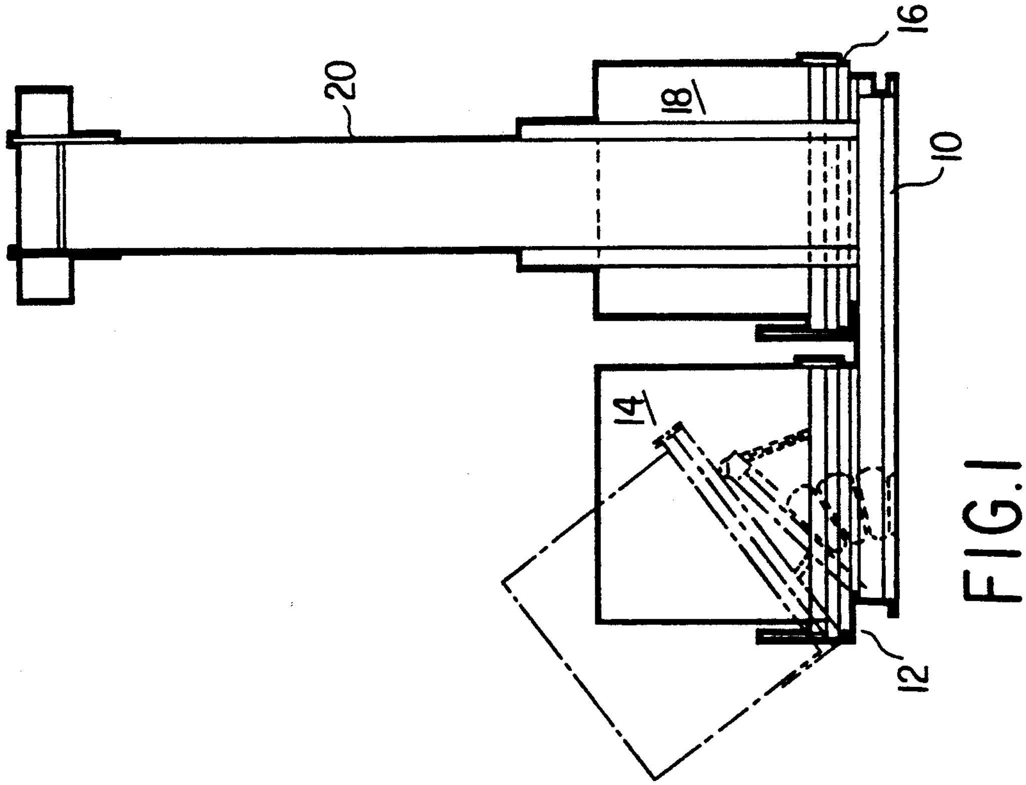
FIG. 1 is a schematic side view of the invention showing the first carriage in the first position and the second carriage in the second position.
Figure 4:
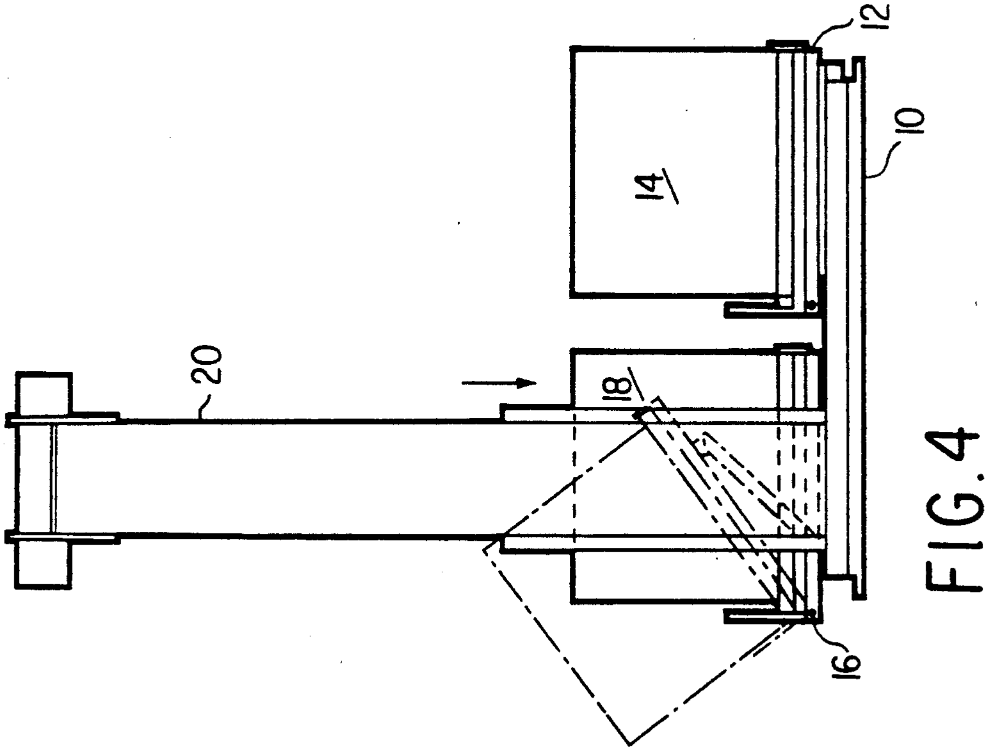
FIG. 4 is a schematic side view of the invention showing the first carriage in the second position and the second carriage in the first position.
Figure 3:
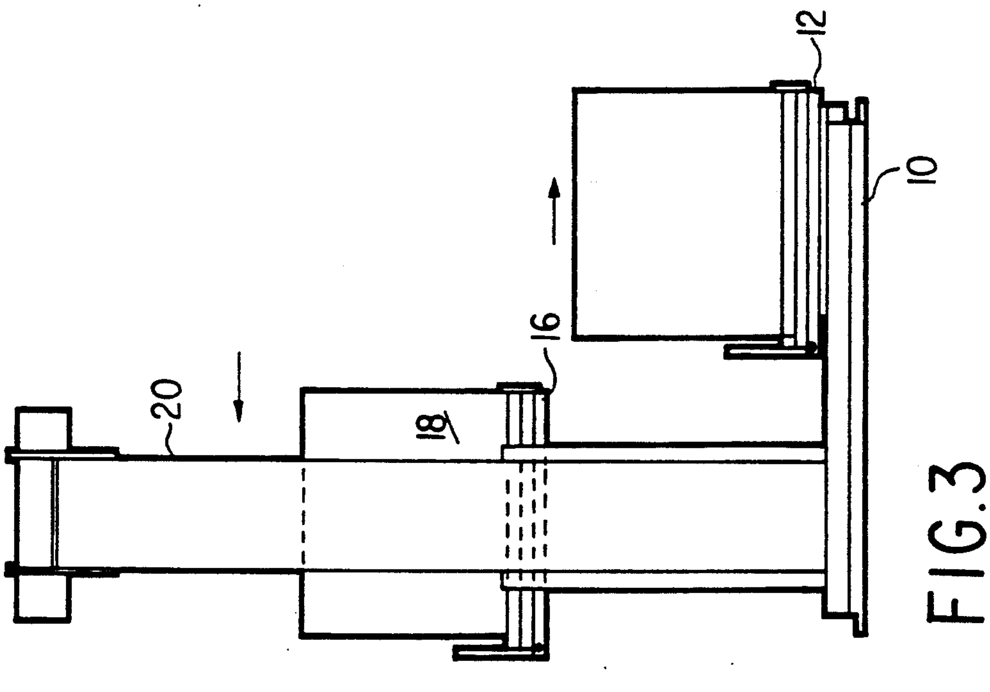
FIG. 3 is a schematic side view of the invention showing the first carriage in the second position and the second carriage in a second intermediate position.

The General Mode of Operation of the Invention

FIGS. 1–4 illustrate the mode of operation of the invention in schematic form. As illustrated in those drawings, the invention comprises a base 10 (which may be fabricated as a part of the assembly including the other components of the invention or which may be part of another facility on which the other components of the invention are mounted), a first carriage 12 (shown carrying a first palletized load 14), a second carriage 16 (shown carrying a second palletized load 18), and a gantry 20. In use, the first carriage 12 is moved back and forth between a first position (shown in FIGS. 1 and 2) and a second position (shown in FIGS. 3 and 4); the second carriage 16 is moved from a first position (shown in FIG. 1) which is identical to the second position of the first carriage 12 to a second position (shown in FIG. 2), from the second position to a third position (shown in FIG. 3), from the third position to a fourth position (shown in FIG. 4) which is identical to the first position of the first carriage 12, and vice-versa; and the gantry 20 is moved back and forth between a first position (shown in FIGS. 1 and 2) and a second position (shown in FIGS. 3 and 4). When either the first carriage 12 or the second carriage 16 is in the position shown at the left in FIGS. 1 and 4, the carriage can be tilted to provide ready access to its interior and/or to the interior of a load carried by the carriage. Although not illustrated, it is contemplated that a tilting mechanism could also be provided at the position shown at the right in FIGS. 1 and 4, so that both carriages could be tilted when in each end position.

A sequence of movements (which could be either a loading or an unloading sequence) will now be described. In the first stage of the sequence (shown in FIG. 1), the first carriage 12 is on the left at ground level, and the second carriage 16 is on the right at ground level. In this stage of the sequence, the first carriage 12 can be tilted back and forth between the position shown in solid line and the position shown in broken line. In the second stage of the sequence (shown in FIG. 2), the first carriage 12 remains on the left at ground level, and the second carriage 16 is moved vertically relative to the gantry 20 to an elevated position while remaining on the right. In the third stage of the sequence (shown in FIG. 3), the first carriage 12 is moved from the left to the right while remaining at ground level, and the second carriage 16 is moved from the right to the left while remaining in an elevated position. In the fourth stage of the sequence (shown in FIG. 4), the first carriage 12 remains on the right at ground level, and the second carriage 16 is moved vertically relative to the gantry 20 back to ground level while remaining on the left. Thus, the first carriage 12 and the second carriage 16 have exchanged positions. In the fourth stage of the sequence, the second carriage 16 can be tilted back and forth between the position shown in solid line and the position shown in broken line.

To reverse the positions of the first carriage 12 and the second carriage 16, the sequence of motions is reversed. That is, the first carriage 12 remains at ground level and moves back to its first position, and the second carriage 16 is moved from its lower left position to its upper left position, from its upper left position to its upper right position, and from its upper right position to its lower right position.

It is important to bear in mind throughout the description that the first and second carriages 12 and 16 are distinct and that each carriage follows a different path. The first carriage 12 does not move vertically, and the second carriage 16 does not move in a single linear path.

Turning to FIGS. 5-12, the presently preferred apparatus for accomplishing the foregoing results will be seen.

The apparatus for Tilting The Carriages

Figure 5:
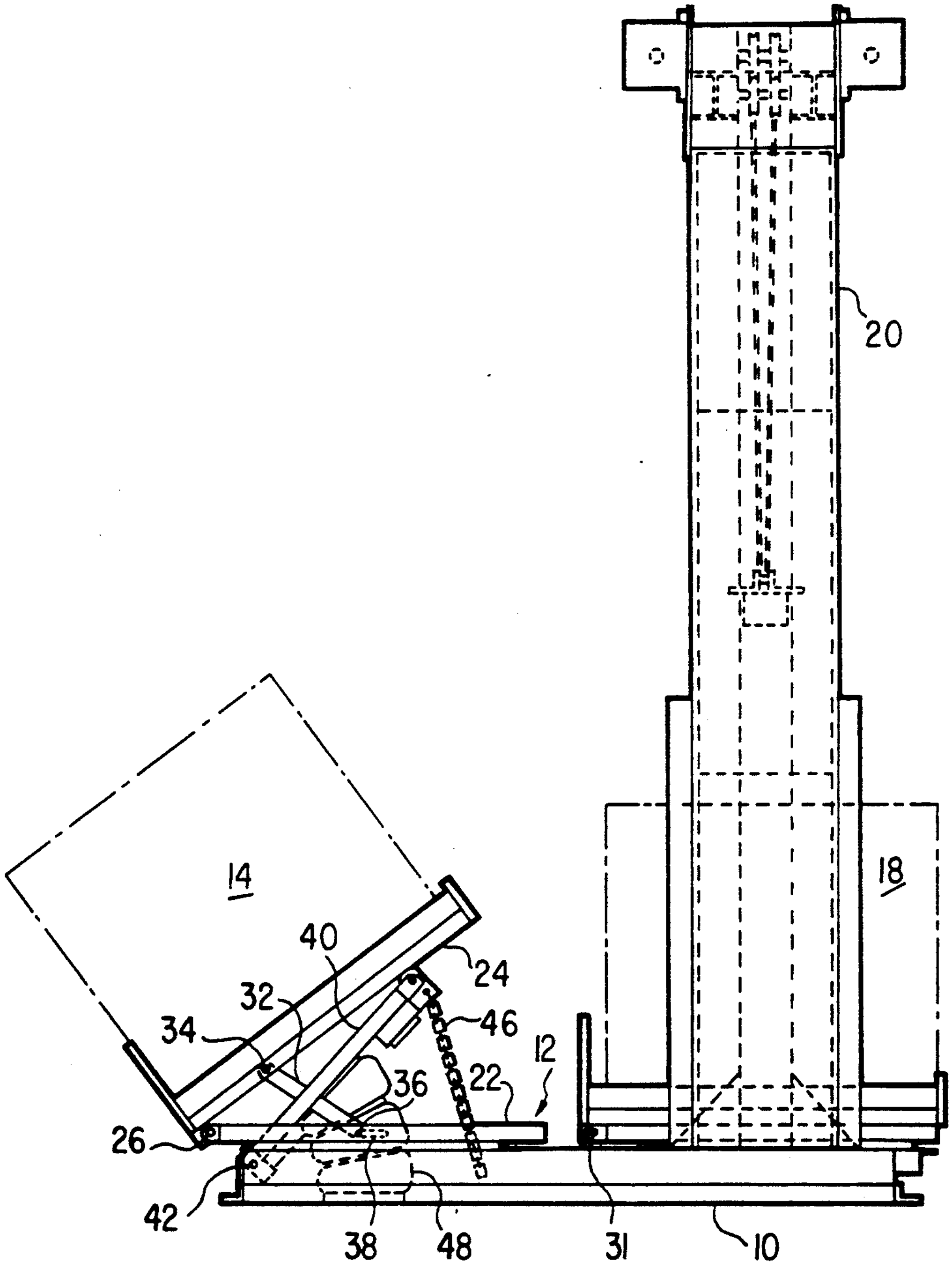
FIG. 5 is a side view of the invention showing the first carriage in the first position, the second carriage in the second position, the apparatus for moving the second carriage up and down relative to the gantry, and the apparatus for tilting the carriages.
Figure 6:
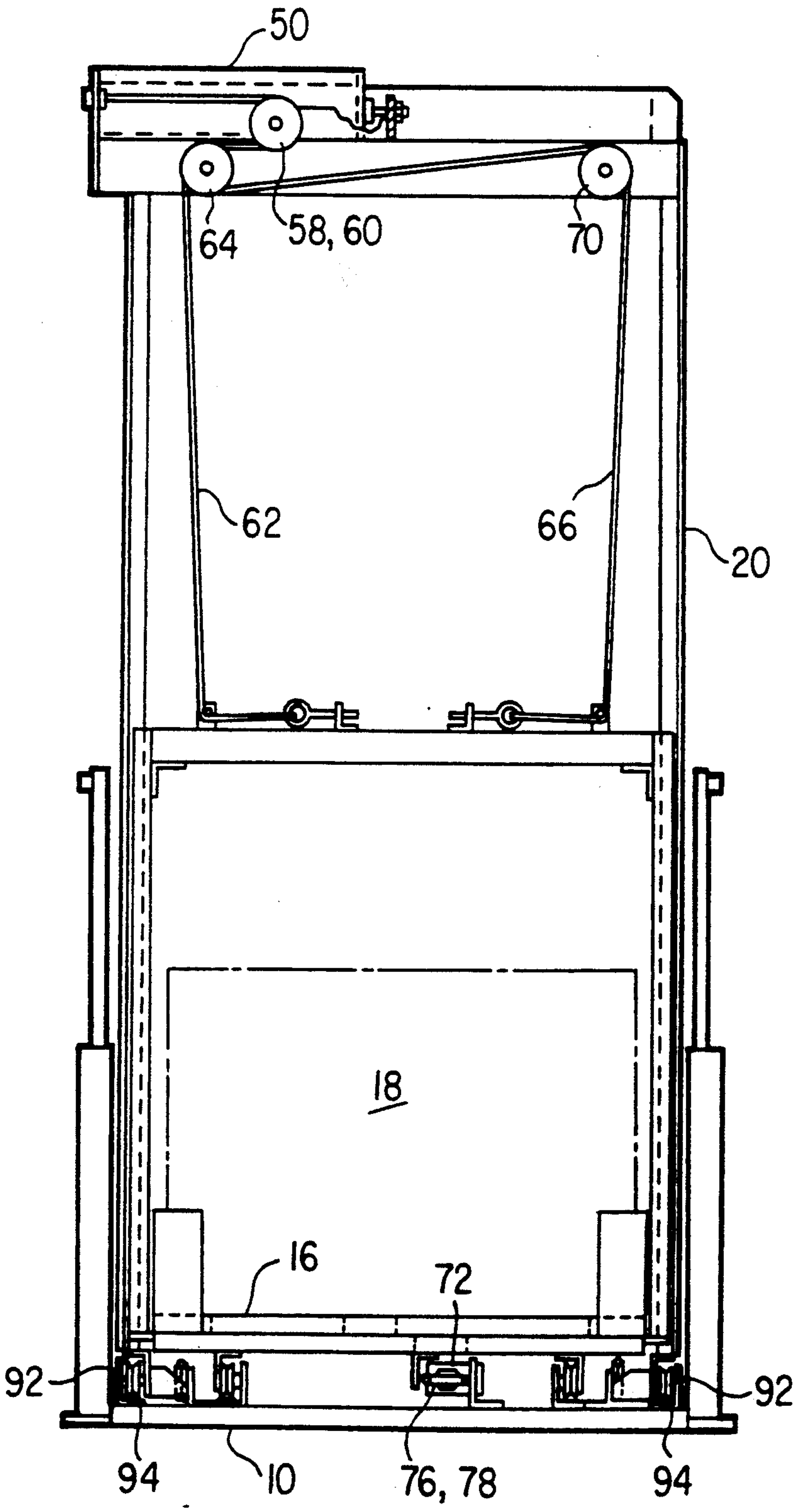
FIG. 6 is a partly broken away end view showing the second carriage in the second position, the apparatus for moving the second carriage up and down relative to the gantry, the rails on which the first carriage and the gantry ride, and the apparatus for moving the carriage back and forth between the first and second positions.
Figure 7:
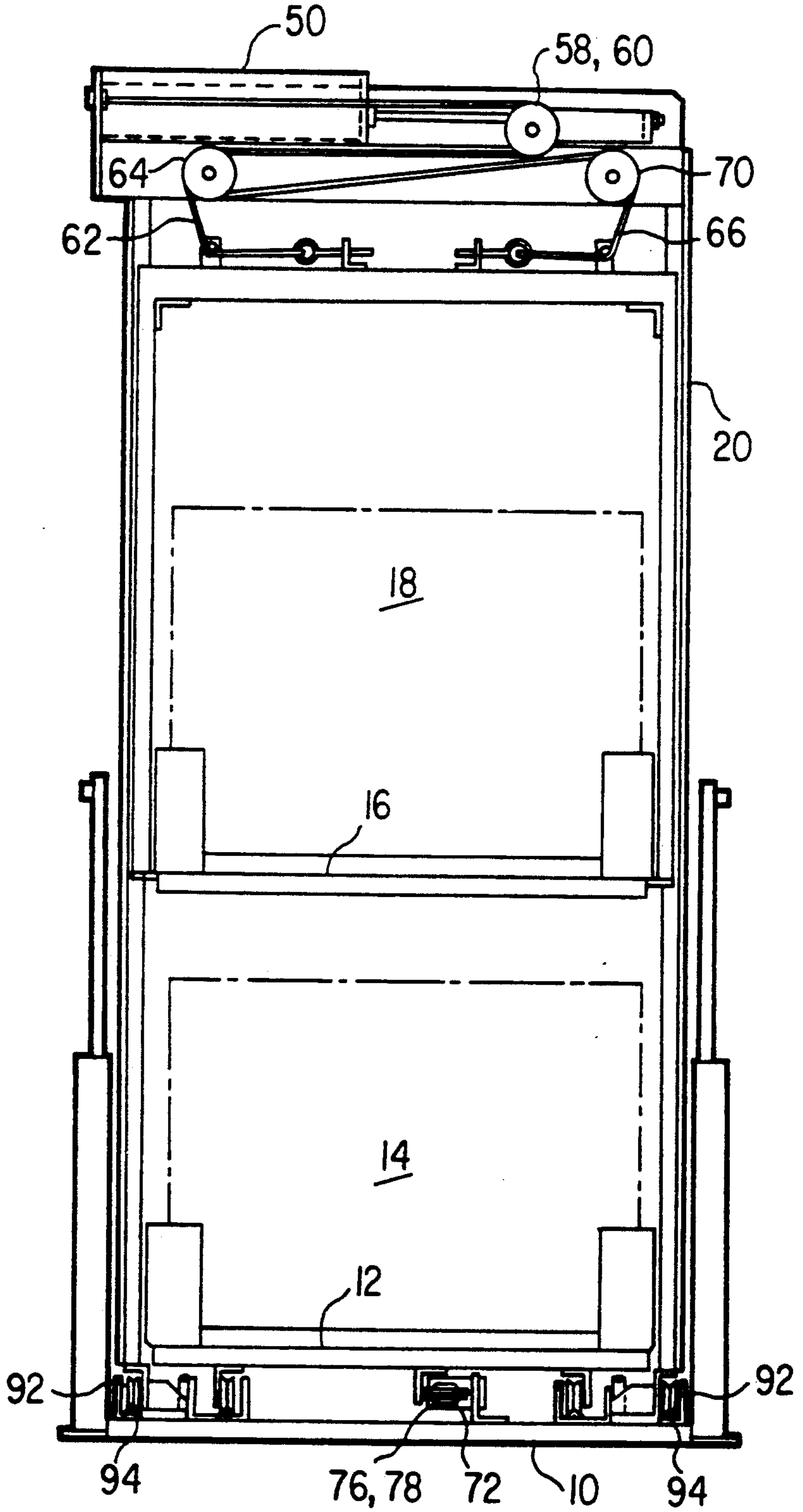
FIG. 7 is a view similar to FIG. 6 except that the second carriage is in the first intermediate position.
Figure 8:
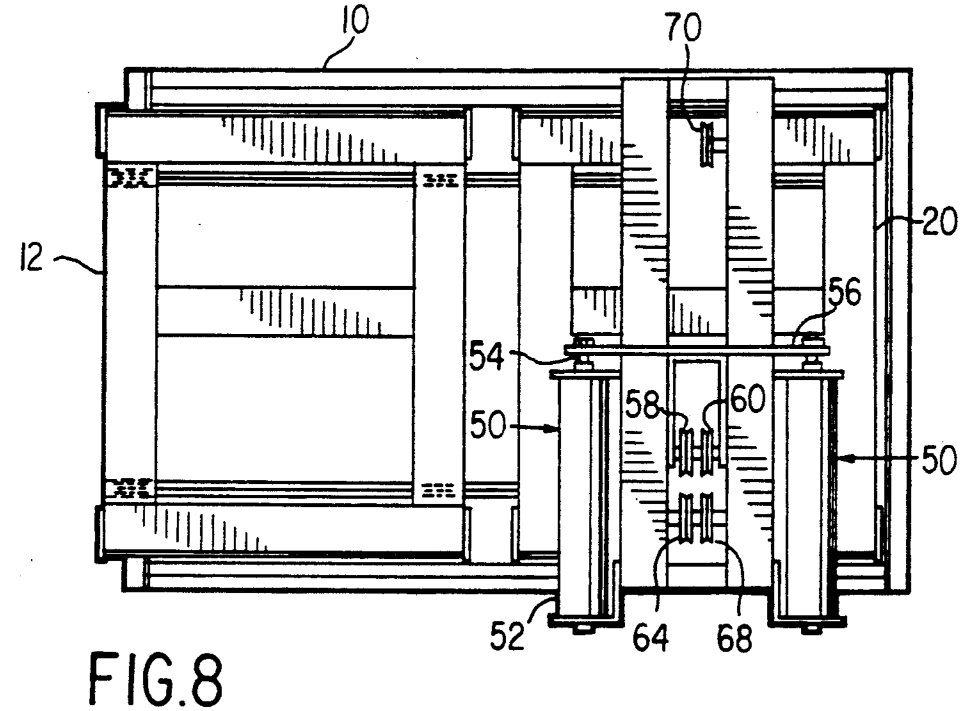
FIG. 8 is a top view showing the apparatus for moving the second carriage up and down relative to the gantry.
Figure 9:
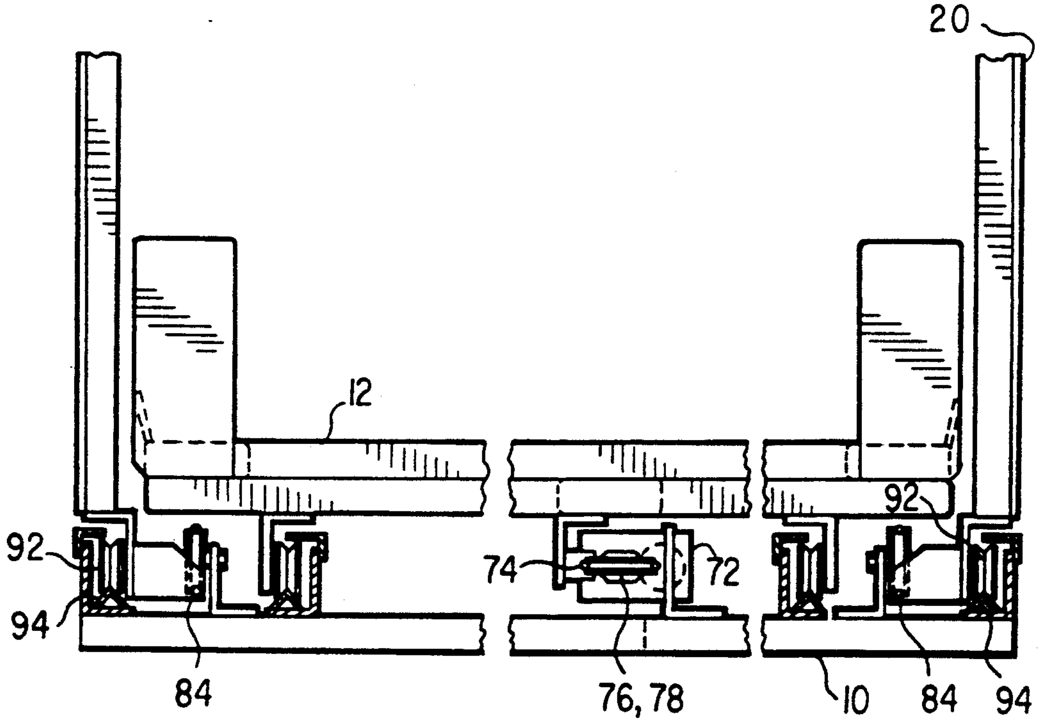
FIG. 9 is an end view on an enlarged scale showing the rails on which the first carriage and the gantry ride, the apparatus for moving the first carriage back and forth between the first and second positions, and the apparatus for moving the gantry back and forth.

FIG. 5 shows the apparatus for tilting the first and second carriages 12 and 16 to provide ready access to their insides. In FIG. 5, the apparatus is being used with the first carriage 12, but it should be recognized that the same apparatus is used to tilt the second carriage 16 when it is in the same position.

The first carriage 12 comprises a base member 22 and a pivoting member 24 hingedly mounted on the base member 22 via a pivot pin 26. Similarly, the second carriage 16 comprises a base member 28 and a pivoting member 30 hingedly mounted on the base member 28 via a pivot pin 31. The pivoting members 24 and 30 carry the palletized loads 14 and 18, respectively. One end of a strut 32 is hingedly mounted on the pivoting member 24 via a pivot pin 34, and the other end of the strut 32 mounts a roller pin 36 that slides in a slot 38 in the base member 22. Abutment of the roller pin 36 with the proximal end of the slot 38 serves to limit pivotal movement of the pivoting member 24. (Of course, other types of limiting devices could be substituted for the strut 32.) Although not shown in detail, the second carriage 16 is similarly constructed.

One end of a tilting arm 40 is hingedly mounted on the base 10 via a pivot pin 42, and the other end of the tilting arm 40 mounts a contact roller 44 that rolls along the underside of the pivoting member 24 as the pivoting member 24 and the tilting arm 40 pivot about their respective pivot pins 26 and 42. One end of a chain 46 is connected to the base 10, and the other end of the chain 46 is connected to the distal end of the tilting arm 40. The chain 46 serves to limit pivotal motion of the tilting arm 40. (Of course, other types of limiting devices could be substituted for the chain 46.)

One end of an inflatable member 48 abuts against and is preferably connected to the base 10, and the other end of the inflatable member 48 abuts against and is preferably connected to the tilting arm 40. Inflation of the inflatable member 48 causes the tilting arm 40 to pivot away from the base 10 around the pivot pin 42, and the motion of the tilting arm 40 in turn causes the pivoting member 24 or 30 of whichever carriage 12 or 16 is in the first position to pivot about its pivoting pin. Deflation of the inflatable member 48 correspondingly allows the tilting arm 40 and the pivoting member 24 or 30 to pivot baok into their rest positions. (0f course, other types of prime movers could be substituted for the inflatable member 48.)

The Apparatus for Raising and Lowering the SEcond Carriage Relative to the Gantry The prime mover for the vertical motion of the second carriage 16 is preferably a pair of fluid cylinders 50 mounted on the gantry 20. (Of course, a single fluid cylinder could be used, and other types of prime movers could be substituted for the fluid cylinder 50.) Each fluid cylinder 50 comprises a cylinder 52 and a rod 54. A yoke 56 is mounted on the rods 54, and a first sheave 58 and a second sheave 60 are mounted on the yoke 56. A first cable 62 is connected at one end to one of the fluid cylinders 50 or to the gantry 20, trained ove the first sheave 58 mounted on the yoke 56, trained over a third sheave 64 mounted on the gantry 20, and connected at the other end to the second carriage 16. A second cable 66 is connected at one end to one of the fluid cylinders 50 or the gantry 20, trained over the second sheave 60, trained over a fourth sheave 68, trained over a fifth sheave 70, and connected at the other end of the second carriage 16. Thus, when the fluid cylinders 50 are extended, the second carriage 16 is moved from its lower position to its upper position, and when the fluid cylinders 50 are retracted, the second carriage 16 is moved from its upper position to its lower position.

Due to the arrangement of the sheaves, the vertical motion of the second carriage 16 is approximately twice the horizontal motion of the rods 54. In addition, due to the arrangement of the first and second sheaves 58 and 60 on the yoke 56 in a position recessed relative to the working ends of the cylinders 52, the rods 54 do not extend beyond the gantry 20 even when in their most extended positions.

The Apparatus for Moving the First Carriage and the Gantry Back and Forth

The prime mover for the horizontal motion of both the first oarriage 12 and the gantry 20 is a fluid oylinder 72 mounted on the base 10. While any convenient type of fluid cylinder (or, indeed, any other convenient type of prime mover) could be used, I prefer to use a cable cylinder incorporating a cable 74 (best seen in FIG. 12). The cable 74 is trained over a sixth sheave 76 and a seventh sheave 78. A dog 80 is carried by the cable 74 and attached to the first carriage 12. Thus, actuation and retraction of the fluid cylinder 72 effects reciprocation of the first carriage 12.

Figure 10:
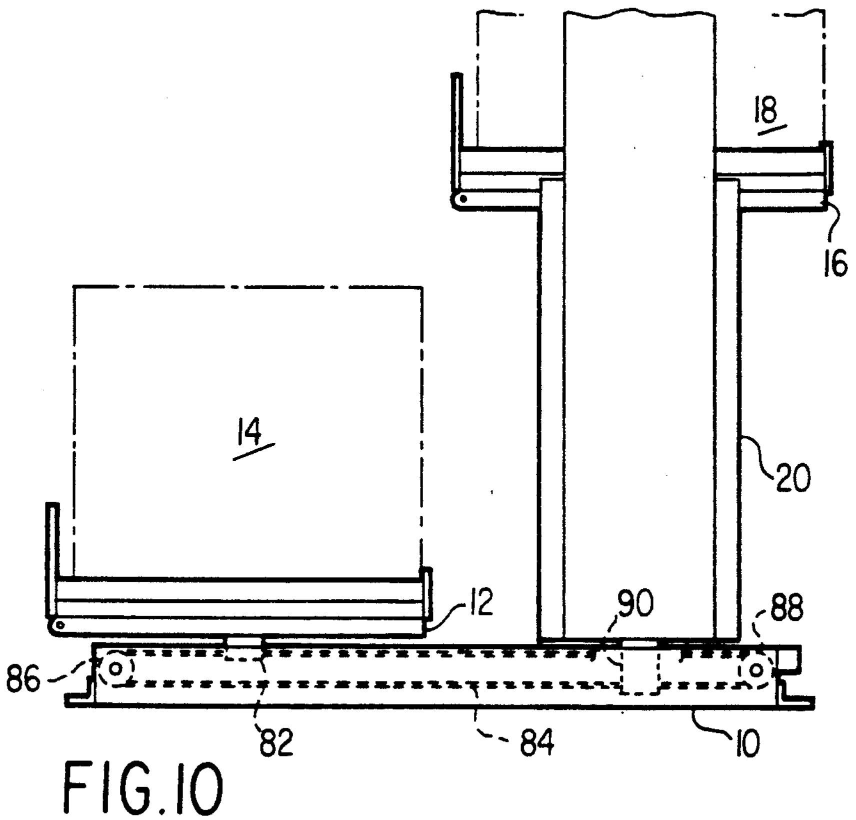
FIG. 10 is a side view showing the first carriage in the first position, the apparatus for moving the first carriage back and forth between the first and second positions, and the apparatus for moving the gantry back and forth.
Figure 11:
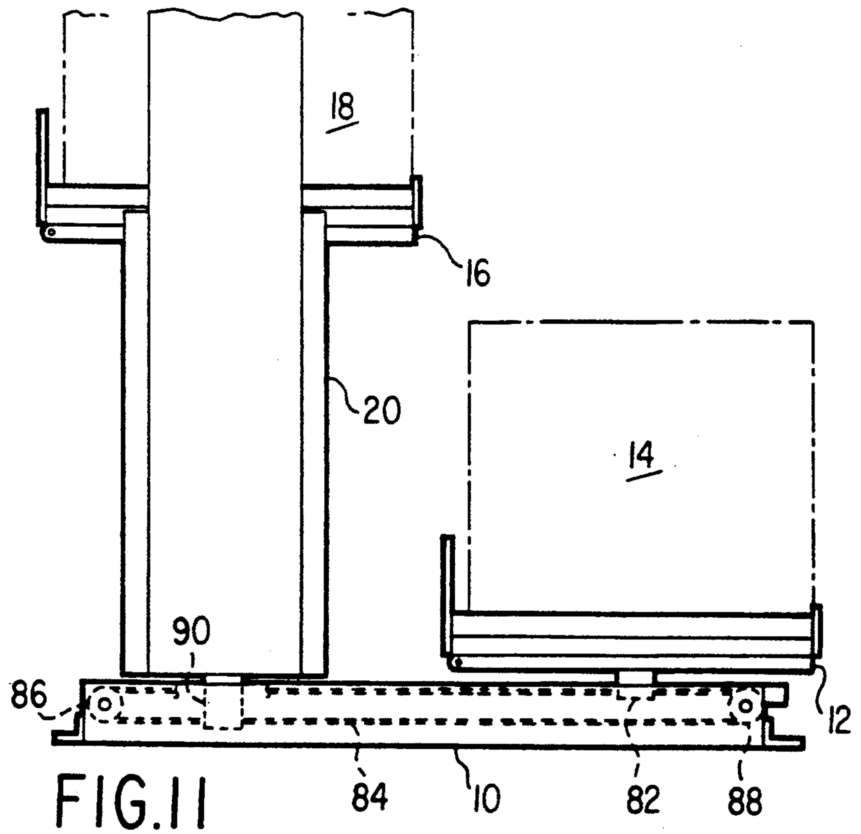
FIG. 11 is a view similar to FIG. 10 except that it shows the first carriage in the second position.
Figure 12:
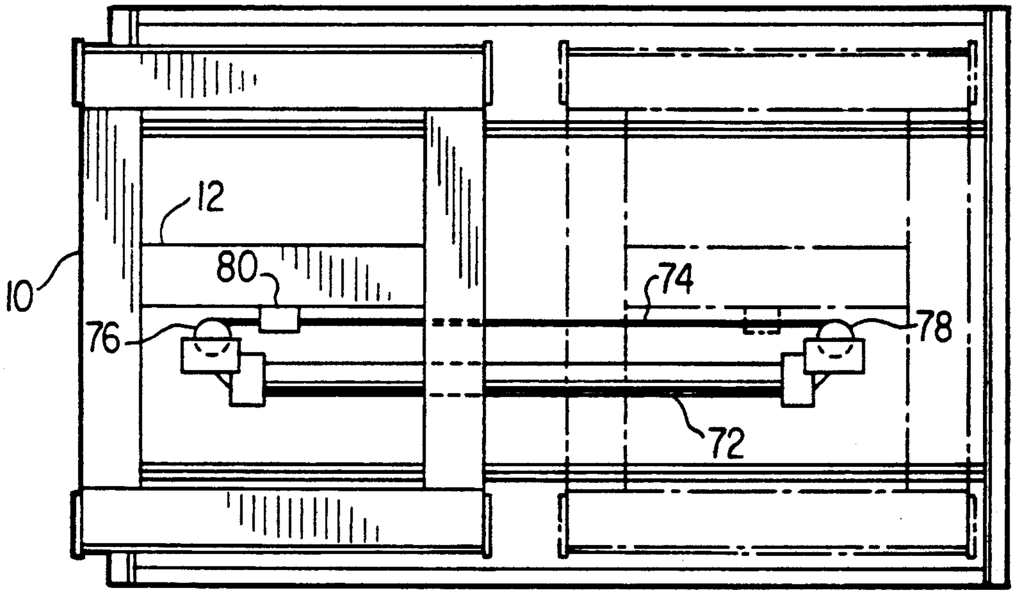
FIG. 12 is a bottom view showing the apparatus for moving the first carriage back and forth between the first and second positions.

The first carriage 12 is in turn attached via a dog 82 on each transverse side to the top run of a cable 84. Each cable 84 is trained over an eighth sheave 86 mounted at the left end of the base 10 (as seen in FIGS. 10 and 11) and a ninth sheave 88 mounted at the right end of the base 10. The gantry 20 is attached via a dog 90 on each transverse side to the bottom run of each cable 84. Thus, when the fluid cylinder 72 is actuated in one direction, the first carriage 12 will move to the left while the gantry 20 moves to the right, and when the fluid cylinder 72 is actuated in the other direction, the first carriage 12 will move to the right while the gantry 20 moves to the left.

The gantry 20 is mounted on a plurality of wheels 92 that roll on a track 94 on each transverse side of the base 10. Similarly, the first carriage 12 is mounted on a plurality of wheels 96 that roll on a track 98 on each transverse side of the base 10.

Caveat

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by letters patent of the United States is:

1. Apparatus for loading and unloading objects, said apparatus comprising:
(a) a first carriage;
(b) first means for moving said first carriage back and forth in a straight line in a first plane between a first position and a second position, said first means comprising:
(i) a first chain having a first run that is parallel to said first plane;
(ii) third means for attaching said first carriage to said first run of said first chain; and
(iii) fourth means for moving said first run of said first chain back and forth;
(c) a second carriage;
(d) second means for moving said second carriage back and forth between said first position and said second position such that, when said first carriage is in said first position, said second carriage is in said second position and, as said first carriage moves to said second position, said second carriage moves out of said first plane, then back into said first plane and into said first position, said second means comprising:
(i) a gantry;
(ii) a second chain having a first run that is parallel to said first plane;
(iii) fifth means for attaching said gantry to said first run of said second chain; and
(iv) sixth means for moving said second carriage up and down relative to said gantry, said sixth means comprising a third chain a first end of which is attached to said second carriage; and
(e) means for tilting both carriages to provide ready access to the inside of ech carriage at least when each carriage is in said first position.

2. Apparatus as recited in claim 1 wherein:
(a) said first plane is a horizontal plane and
(b) during its movement from said first position to said second position and vice-versa, said second carriage moves vertically out of said first plane, then moves horizontally in a second horizontal plane, and then moves vertically back into said first plane.

3. Apparatus as recited in claim 1 wherein said fourth means comprises a first fluid cylinder.

4. Apparatus as recited in claim 1 wherein said gantry and said first carriage move simultaneously.

5. Apparatus as recited in claim 1 wherein a second end of said third chain is fixed relative to said gantry.

6. Apparatus as recited in claim 1 wherein said means for tilting comprises an inflatable member.

7. Apparatus as recited in claim 1 wherein:
(a) said sixth means further comprise:
(i) a second fluid cylinder comprising a cylinder mounted on said gantry and a piston and
(ii) a first sheave mounted on said piston and
(b) said third chain is trained over said first sheave and has a first end attached to said second carriage and a second end attached to said cylinder.

8. Apparatus as recited in claim 7 wherein said sixth means further comprise:
(a) a second sheave mounted on said piston and
(b) a fourth chain trained over said second sheave and having a first end attached to said second carriage and a second end attached to said cylinder.

9. Apparatus as recited in claim 7 wherein said sixth means further comprises:
(a) a second sheave mounted on said piston and
(b) a fourth chain trained over said second sheave and having a first end attached to said second carriage and a second end attached to said cylinder.

10. Apparatus as recited in claim 1 wherein:
(a) said sixth means further comprise:
(i) a second fluid cylinder comprising a cylinder mounted on said gantry and a piston and
(ii) a first sheave mounted on said piston and
(b) said third chain is trained over said first sheave and has a first end attached to said second carriage and a second end attached to said cylinder.

11. Apparatus as recited in claim 10 wherein said sixth means further comprise:
(a) a second sheave mounted on said piston and
(b) a fourth chain trained over said second sheave and having a first end attached to said second carriage and a second end attached to said cylinder.

12. Apparatus as recited in claim 10 wherein said sixth means further comprise:
(a) a second sheave mounted on said piston and
(b) a fourth chain trained over said second sheave and having a first end attached to said second carriage and a second end attached to said gantry.

13. Apparatus for loading and unloading objects, said apparatus comprising:
(a) a first carriage;

(b) first means for moving said first carriage back and forth in a straight line in a first plane between a first position and a second position, said first means comprising:
(i) a first chain having a first run that is parallel to said first plane;
(ii) third means for attaching said first carriage to said first run of said first chain; and
(iii) fourth means for moving said first run of said first chain back and forth;
(c) a second carriage;
(d) second means for moving said second carriage back and forth between said first position and said second position such that, when said first carriage is in said first position, said second carriage is in said second position and, as said first carriage moves to said second position, said second carriage moves out of said first plane, then back into said first plane and into said first position, said second means comprising:
(i) a gantry;
(ii) a second chain having a first run that is parallel to said first plane;
(iii) fifth means for attaching said gantry to said first run of said second chain; and
(iv) sixth means for moving said second carriage up and down relative to said gantry, said sixth means comprising:
(A) a second fluid cylinder comprising a cylinder mounted on said gantry and a piston;
(B) a first sheave mounted on said piston; and
(C) a third chain trained over said first sheave and having a first end attached to said second carriage and a second end attached to said cylinder; and
(e) means for tilting both carriages to provide ready access to the inside of each carriage at least when each carriage is in said first position.

14. Apparatus as recited in claim 13 wherein said sixth means further comprise:
(a) a second sheave mounted on said piston and
(b) a fourth chain trained over said second sheave and having a first end attached to said second carriage and a second end attached to said cylinder.

15. Apparatus as recited in claim 13 wherien said means for tilting comprises an inflatable member.

16. Apparatus as recited in claim 13 wherein:
(a) said first plane is a horizontal plane and
(b) during its movement from said first position to said second position and vice-versa, said second carriage moves vertically out of said first plane, then moves horizontally in a second horizontal plane, and then moves vertically back into said first plane.

17. Apparatus as recited in claim 13 wherein said fourth means comprises a first fluid cylinder.

18. Apparatus as recited in claim 13 wherein said gantry and said first carriage move simultaneously.

19. Apparatus as recited in claim 13 wherein a second end of said third chain is fixed relative to said gantry.

20. Apparatus as recited in claim 13 wherein said sixth means further comprise:
(a) a second sheave mounted on said piston and
(b) a fourth chain trained over said second sheave and having a first end attached to said second carriage and a second end attached to said gantry.

21. Apparatus for loading and unloading objects, said apparatus comprising:
(a) a first carriage;
(b) first means for moving said first carriage back and forth in a straight line in a first plane between a first position and a second position, said first means comprising:
(c) a second carriage;
(d) second means for moving said second carriage back and forth between said first position and said second position such that, when said first carriage is in said first position, said second carriage is in said second position and, as said first carriage moves to said second position, said second carriage moves out of said first plane, then back into said first plane and into said first position, said second means comprising:
(i) a gantry;
(ii) a second chain having a first run that is parallel to said first plane;
(iii) seventh means for attaching said gantry to said first run of said second chain; and
(iv) eighth means for moving said second carriage relative to said gantry, said eighth means comprising:
(A) a second fluid cylinder comprising a cylinder mounted on said gantry and a piston;
(B) a first sheave mounted on said piston; and
(C) a third chain trained over said first sheave and having a first end attached to said second carriage and a second end attached to said cylinder; and
(e) ninth means for tilting both carriages to provide ready access to the inside of each carriage at least when each carriage is in said first position.

22. Apparatus as recited in claim 21 wherein said gantry and said first carriage move simultaneously.

23. Apparatus as recited in claim 21 wherein a second end of said second chain is fixed relative to said gantry.

24. Apparatus as recited in claim 21 wherein said eighth means further comprises:
(a) a second sheave mounted on said piston and
(b) a fourth chain trained over said second sheave and having a first end attached to said second carriage and a second end attached to said cylinder.

25. Apparatus as recited in claim 21 wherein:
(a) said first plane is a horizontal plane and
(b) during its movement from said first position to said second position and vice versa, said second carriage moves vertically out of said first plane, then moves horizontally in a second horizontal plane, and then moves vertically back into said first plane.

26. Apparatus as recited in claim 21 wherein said first means comprise:
(a) a first chain having a first run that is parallel to said first plane;
(b) third means for attaching said first carriage to said first run of said first chain; and
(c) fourth means for moving said first run of said first chain back and forth.

27. Apparatus as recited in claim 26 wherein said fourth means comprises a first fluid cylinder.

28. Apparatus as recited in claim 21 wherein said ninth means comprises an inflatable member.

29. Apparatus as recited in claim 21 wherein said eighth means further comprises:
(a) a second sheave mounted on said piston and (b) a fourth chain trained over said second sheave and having a first end attached to said second carriage and a second end attached to said gantry.

30. Apparatus as recited in claim 21 wherein said first means comprise:

(a) a first chain having a first run that is in said first plane;

(b) third means for attaching said first carriage to said first run of said first chain; and (c) fourth means for moving said first run of said first chain back and forth.

31. Apparatus for loading and unloading objects, said apparatus comprising:

(a) a base;

(b) a gantry mounted on said base and projecting upwardly therefrom;

(c) a first carriage mounted on said base;

(d) first means for moving said first carriage back and forth in a straight line on said base between a first position and a second position;

(e) a second carriage mounted on said gantry and positionable in either said first position or said second position;

(f) second means for moving said second carriage up and down relative to said gantry;

(g) third means for moving said gantry back and forth in a straight line on said base;

(h) fourth means for interrelating said first means and said second and third means such that, when said first carriage is in said first position, said second carriage is in said second position and, as said first carriage moves from said first position to said second position, said second carriage moves upwardly on said gantry from said second position, then said gantry moves relative to said base, and then said second carriage moves downwardly on said gantry and into said first position; and (i) means for tilting both carriages to provide ready access to the inside of each carriage at least when each carriage is in said first position.

32. Apparatus as recited in claim 31 wherein said first means comprise:

(a) a first chain having a first run that is parallel to said first base;

(b) fourth means for attaching said first carriage to said first run of said first chain; and (c) fifth means for moving said first run of said first chain back and forth.

33. Apparatus as recited in claim 32 wherein said fifth means comprises a first fluid cylinder.

34. Apparatus as recited in claim 32 wherein said third means comprise:

(a) a second chain having a first run that is parallel to said base and (b) sixth means for attaching said gantry to said first run of said second chain.

35. Apparatus as recited in claim 34 wherein said gantry and said first carriage move simultaneously.

36. Apparatus as recited in claim 34 wherein said second means comprises a third chain a first end of which is attached to said second carriage.

37. Apparatus as recited in claim 36 wherein a second end of said third chain is fixed relative to said gantry.

38. Apparatus as recited in claim 34 wherein said second means comprise:

(a) a second fluid cylinder comprising a cylinder mounted on said gantry and a piston;

(b) a first sheave mounted on said piston; and (c) a third chain trained over said first sheave and having a first end attached to said second carriage and a second end attached to said cylinder.

39. Apparatus as recited in claim 38, wherein said second means further comprise:

(a) a second sheave mounted on said piston and (b) a fourth chain trained over said second sheave and having a first end attached to said second carriage and a second end attached to said cylinder.

40. Apparatus as recited in claim 38, wherein said second means further comprise:

(a) a second sheave mounted on said piston and (b) a fourth chain trained over said second sheave and having a first end attached to said second carriage and a second end attached to said gantry.

41. Apparatus as recited in claim 34 wherein said second means comprise:

(a) a second fluid cylinder comprising a cylinder mounted on said gantry and a piston;

(b) a first sheave mounted on said piston; and (c) a third chain trained over said first sheave and having a first end attached to said second carriage and a second end attached to said gantry.

42. Apparatus as recited in claim 41, wherein said second means further comprise:

(a) a second sheave mounted on said piston and (b) a fourth chain trained over said second sheave and having a first end attached to said second carriage and a second end attached to said cylinder.

43. Apparatus as recited in claim 41, wherein said second means further comprise:

(a) a second sheave mounted on said piston and (b) a fourth chain trained over said second sheave and having a first end attached to said second carriage and a second end attached to said cylinder.

44. Apparatus as recited in claim 31 wherein said third means comprise:

(a) a second chain having a first run that is parallel to said base and (b) seventh means for attaching said gantry to said first run of said second chain.

45. Apparatus as recited in claim 44 wherein said gantry and said first carriage move simultaneously.

46. Apparatus as recited in claim 44 wherein said second means comprises a third chain a first end of which is attached to said second carriage.

47. Apparatus as recited in claim 46 wherein a second end of said second chain is fixed relative to said gantry.

48. Apparatus as recited in claim 44 wherein said second means comprises:

(a) a second fluid cylinder comprising a cylinder mounted on said gantry and a piston;

(b) a first sheave mounted on said piston; and (c) a third chain trained over said first sheave and having a first end attached to said second carriage and a second end attached to said cylinder.

49. Apparatus as recited in claim 48, wherein said second means further comprise:

(a) a second sheave mounted on said piston and (b) a fourth chain trained over said second sheave and having a first end attached to said second carriage and a second end attached to said cylinder.

50. Apparatus as recited in claim 48, wherein said second means further comprises:

(a) a second sheave mounted on said piston and (b) a fourth chain trained over said second sheave and having a first end attached to said second carriage and a second end attached to said gantry.

51. Apparatus as recited in claim 44 wherein said second means comprises:
(a) a second fluid cylinder comprising a cylinder mounted on said gantry and a piston;
(b) a first sheave mounted on said piston; and
(c) a third chain trained over said first sheave and having a first end attached to said second carriage and a second end attached to said gantry.

52. Apparatus as recited in claim 51, wherein said second means further comprises:
(a) a second sheave mounted on said piston and
(b) a fourth chain trained over said second sheave and having a first end attached to said second carriage and a second end attached to said cylinder.

53. Apparatus as recited in claim 51, wherein said second means further comprises:
(a) a second sheave mounted on said piston and
(b) a fourth chain trained over said second sheave and having a first end attached to said second carriage and a second end attached to said gantry.

54. Apparatus as recited in claim 31 wherein said means comprises an inflatable member.

55. Apparatus for loading and unloading objects, said apparatus comprising:
(a) a first carriage;
(b) first means for moving said first carriage back and forth in a straight line in a first plane between a first position and a second position;
(c) a second carriage;
(d) second means for moving said second carriage back and forth between said first position and said second position such that, when said first carriage is in said first position, said second carriage is in said second position and, as said first carriage moves to said second position, said second carriage moves out of said first plane, then back into said first plane and into said second position; and
(e) means for tilting both carriages to provide ready access to the inside of each carriage at least when each carriage is in said first position.

56. Apparatus as recited in claim 55 wherein:
(a) said first plane is a horizontal plane and
(b) during its movement from said first position to said second position and vice versa, said second carriage moves vertically out of said first plane, then moves horizontally in a second horizontal plane, and then moves vertically back into said first plane.

57. Apparatus as recited in claim 55 wherein said first means comprise:
(a) a first chain having a first run that is parallel to said first plane;
(b) third means for attaching said first carriage to said first run of said first chain; and
(c) fourth means for moving said first run of said first chain back and forth.

58. Apparatus as recited in claim 57 wherein said fourth means comprises a first fluid cylinder.

59. Apparatus as recited in claim 57 wherein said second means comprise:
(a) a gantry;
(b) a second chain having a first run that is parallel to said first plane; and
(c) fifth means for attaching said gantry to said first run of said second chain.

60. Apparatus as recited in claim 59 wherein said gantry and said first carriage move simultaneously.

61. Apparatus as recited in claim 59 wherein said second means further comprises sixth means for moving said second carriage up and down relative to said gantry.

62. Apparatus as recited in claim 61 wherein said sixth means comprises a third chain a first end of which is attached to said second carriage.

63. Apparatus as recited in claim 62 wherein a second end of said third chain is fixed relative to said gantry.

64. Apparatus as recited in claim 61 wherein said sixth means comprise:
(a) a second fluid cylinder comprising a cylinder mounted on said gantry and a piston;
(b) a first sheave mounted on said piston; and
(c) a third chain trained over said first sheave and having a first end attached to said second carriage and a second end attached to said cylinder.

65. Apparatus as recited in claim 64 wherein said sixth means further comprise:
(a) a second sheave mounted on said piston and
(b) a fourth chain trained over said second sheave and having a first end attached to said second carriage and a second end attached to said cylinder or to said gantry.

66. Apparatus as recited in claim 64, wherein said second means further comprise:
(a) a second sheave mounted on said piston and
(b) a fourth chain trained over said second sheave and having a first end attached to said second carriage and a second end attached to said gantry.

67. Apparatus as recited in claim 61 wherein said sixth means comprise:
(a) a second fluid cylinder comprising a cylinder mounted on said gantry and a piston;
(b) a first sheave mounted on said piston; and
(c) a third chain trained over said first sheave and having a first end attached to said second carriage and a second end attached to said gantry.

68. Apparatus as recited in claim 67 wherein said sixth means further comprise:
(a) a second sheave mounted on said piston and
(b) a fourth chain trained over said second sheave and having a first end attached to said second carriage and a second end attached to said cylinder.

69. Apparatus as recited in claim 67, wherein said second means further comprise:
(a) a second sheave mounted on said piston and
(b) a fourth chain trained over said second sheave and having a first end attached to said second carriage and a second end attached to said gantry.

70. Apparatus as recited in claim 69 wherein said sixth means further comprise:
(a) a second sheave mounted on said piston and
(b) a fourth chain trained over said second sheave and having a first end attached to said second carriage and a second end attached to said cylinder.

71. Apparatus as recited in claim 69 wherein said sixth means further comprises:
(a) a second sheave mounted on said piston and
(b) a fourth chain trained over said second sheave and having a first end attached to said second carriage and a second end attached to said gantry.

72. Apparatus as recited in claim 55 wherein said second means comprise:
(a) a gantry;
(b) a second chain having a first run that is parallel to said first plane; and (c) seventh means for attaching said gantry to said first run of said second chain.

73. Apparatus as recited in claim 72 wherein said gantry and said first carriage move simultaneously.

74. Apparatus as recited in claim 72 wherein said second means further comprises eighth means for moving said second carriage relative to said gantry.

75. Apparatus as recited in claim 74 wherein said eighth means comprises a third chain a first end of which is attached to said second carriage.

76. Apparatus as recited in claim 75 wherein a second end of said second chain is fixed relative to said gantry.

77. Apparatus as recited in claim 74 wherein said eighth means comprise:

(a) a second fluid cylinder comprising a cylinder mounted on said gantry and a piston;
(b) a first sheave mounted on said piston; and
(c) a third chain trained over said first sheave and having a first end attached to said second carriage and a second end attached to said cylinder.

78. Apparatus as recited in claim 77 wherein said eighth means further comprises:

(a) a second sheave mounted on said piston and
(b) a fourth chain trained over said second sheave and having a first end attached to said second carriage and a second end attached to said cylinder.

79. Apparatus as recited in claim 77 wherein said sixth means further comprises:

(a) a second sheave mounted on said piston and
(b) a fourth chain trained over said second sheave and having a first end attached to said second carriage and a second end attached to said gantry.

80. Apparatus as recited in claim 55 wherein said means for tilting comprises an inflatable member.

81. Apparatus for loading and unloading objects, said apparatus comprising:

(a) a first carriage;
(b) first means for moving said first carriage back and forth in a straight line in a first plane between a first position and a second position, said first means comprising:
  (i) a first chain having a first run that is parallel to said first plane;
  (ii) third means for attaching said first carriage to said first run of said first chain; and
  (iii) fourth means for moving said first run of said first chain back and forth;
(c) a second carriage;
(d) second means for moving said second carriage back and forth between said first position and said second position such that, when said first carriage is in said first position, said second carriage is in said second position and, as said first carriage moves to said second position, said second carriage moves out of said first plane, then back into said first plane and into said first position, said second means comprising:
  (i) a gantry;
  (ii) a second chain having a first run that is parallel to said first plane;
  (iii) fifth means for attaching said gantry to said first run of said second chain; and
  (iv) sixth means for moving said second carriage up and down relative to said gantry, said sixth means comprising:
    (A) a second fluid cylinder comprising a cylinder mounted on said gantry and a piston;
    (B) a first sheave mounted on said piston; and
    (C) a third chain trained over said first sheave and having a first end attached to said second carriage and a second end attached to said gantry; and
(e) means for tilting both carriages to provide ready access to the inside of each carriage at least when each carriage is in said first position.

82. Apparatus as recited in claim 81 wherein said sixth means further comprise:

(a) a second sheave mounted on said piston and
(b) a fourth chain trained over said second sheave and having a first end attached to said second carriage and a second end attached to said cylinder.

83. Apparatus as recited in claim 81 wherein said sixth means further comprise:

(a) a second sheave mounted on said piston and
(b) a fourth chain trained over said second sheave and having a first end attached to said second carriage and a second end attached to said gantry.

84. Apparatus as recited in claim 81 wherein said means for tilting comprise an inflatable member.

85. Apparatus as recited in claim 81 wherein:

(a) said first plane is a horizontal plane and
(b) during its movement from said first position to said second position and vice versa, said second carriage moves vertically out of said first plane, then moves horizontally in a second horizontal plane, and then moves vertically back into said first plane.

86. Apparatus as recited in claim 81 wherein said fourth means comprises a first fluid cylinder.

87. Apparatus as recited in claim 81 wherein said gantry and said first carriage move simultaneously.

88. Apparatus as recited in claim 81 wherein a second end of said third chain is fixed relative to said gantry.

89. Apparatus for loading and unloading objects, said apparatus comprising:

(a) a first carriage;
(b) first means for moving said first carriage back and forth in a straight line in a first plane between a first position and a second position;
(c) a second carriage;
(d) second means for moving said second carriage back and forth between said first position and said second position such that, when said first carriage is in said first position, said second carriage is in said second position and, as said first carriage moves to said second position, said second carriage moves out of said first plane, then back into said first plane and into said first position, said second means comprising:
  (i) a gantry;
  (ii) a second chain having a first run that is parallel to said first plane;
  (iii) seventh means for attaching said gantry to said first run of said second chain; and
  (iv) eighth means for moving said second carriage relative to said gantry, said eighth means comprising:
    (A) a second fluid cylinder comprising a cylinder mounted on said gantry and a piston;
    (B) a first sheave mounted on said piston; and
    (C) a third chain trained over said first sheave and having a first end attached to said second carriage and a second end attached to said gantry; and (e) ninth means for tilting both carriages to provide ready access to the inside of each carriage at least when each carriage is in said first position.

90. Apparatus as recited in claim 89 wherein said gantry and said first carriage move simultaneously.

91. Apparatus as recited in claim 89 wherien a second end of said second chain is fixed relative to said gantry.

92. Apparatus as recited in claim 89 wherein said eighth means further comprises:

(a) a second sheave mounted on said piston and (b) a fourth chain trained over said second sheave and having a first end attached to said second carriage and a second end attached to said cylinder.

93. Apparatus as recited in claim 89 wherein said eighth means further comprises:

(a) a second sheave mounted on said piston and (b) a fourth chain trained over said second sheave and having a first end attached to said second carriage and a second end attached to said gantry.

94. Apparatus as recited in claim 89 wherein:

(a) said first plane is a horizontal plane and (b) during its moement from said first position to said second position and vice versa, said second carriage moves vertically out of said first plane, then moves horizontally in a second horizontal plane, and then moves vertically back into said first plane.

95. Apparatus as recited in claim 89 whereins aid first means comprise:

(a) a first chain having a first run that is parallel to said first plane;

(b) third means for attaching said first carriage to said first run of said first chain; and (c) fourth means for moving said first run of said first chain back and forth.

96. Apparatus as recited in claim 77 wherein said fourth means comprises a first fluid cylinder.

97. Apparatus as recited in claim 89 wherein said ninth means comprises an inflatable member.

98. Apparatus as recited in claim 89 wherein said first means comprise:

(a) a first chain having a first run that is in said first plane;

(b) third means for attaching said first carriage to said first run of said first chain; and (c) fourth means for moving said first run of said first chain back and forth.

* * * * *